US012333481B1

(12) United States Patent
Eccles et al.

(10) Patent No.: US 12,333,481 B1
(45) Date of Patent: *Jun. 17, 2025

(54) DYNAMIC PHYSICAL DATA TRANSFER ROUTING

(71) Applicant: Amazon Technologies, Inc., Seattle, WA (US)

(72) Inventors: Ryan Michael Eccles, Seattle, WA (US); Siddhartha Roy, Sammamish, WA (US); Vaibhav Tyagi, Seattle, WA (US); Wayne William Duso, Charlestown, MA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,561

(22) Filed: Sep. 25, 2023

Related U.S. Application Data

(63) Continuation of application No. 16/809,169, filed on Mar. 4, 2020, now Pat. No. 11,810,056.

(51) Int. Cl.
| | |
|---|---|
| *G06Q 10/08* | (2024.01) |
| *G06K 7/14* | (2006.01) |
| *G06Q 10/047* | (2023.01) |
| *G06Q 10/0835* | (2023.01) |
| *G06Q 10/087* | (2023.01) |
| *G06F 3/0482* | (2013.01) |

(Continued)

(52) U.S. Cl.
CPC ..... *G06Q 10/08355* (2013.01); *G06Q 10/047* (2013.01); *G06Q 10/087* (2013.01); *G09F 3/208* (2013.01)

(58) Field of Classification Search
CPC .......... G06Q 10/08355; G06Q 10/047; G06Q 10/087; G06F 3/208
See application file for complete search history.

(56) References Cited

U.S. PATENT DOCUMENTS

| | | | |
|---|---|---|---|
| 8,650,157 B1 * | 2/2014 | Jha ...................... | G06F 11/1453 707/661 |
| 9,286,491 B2 * | 3/2016 | Roth ..................... | G06F 21/602 |

(Continued)

FOREIGN PATENT DOCUMENTS

CN 108369628 A * 8/2018 ............. G06F 21/44

*Primary Examiner* — Talia F Crawley
(74) *Attorney, Agent, or Firm* — Davis Wright Tremaine LLP

(57) ABSTRACT

Systems and methods are described herein for routing data by transferring a physical storage device for at least part of a route between source and destination locations. In one example, a computing resource service provider, may receive a request to transfer data from a customer center to a data center. The service provider may determine a route, which includes one or more of a physical path or a network path, for the data loaded onto a physical storage device to reach the data center from the customer center. Determining the route may include associating respective cost values to individual physical and network paths between physical stations between the customer and end data centers, and selecting one or more of the paths to reduce a total cost of the route. Route information may then be associated with the physical storage device based on the route.

26 Claims, 7 Drawing Sheets

(51) Int. Cl.
*G06F 3/0488* (2022.01)
*G09F 3/20* (2006.01)

(56) References Cited

U.S. PATENT DOCUMENTS

| | | | | |
|---|---|---|---|---|
| 9,858,325 B1* | 1/2018 | Suver | | G06F 16/278 |
| 9,893,968 B1* | 2/2018 | Nagargadde | | H04L 41/12 |
| 10,007,941 B1* | 6/2018 | Liu | | G06Q 30/0615 |
| 10,225,326 B1* | 3/2019 | Puchala | | H04L 12/5691 |
| 10,630,767 B1* | 4/2020 | Dhoolam | | G06F 9/445 |
| 10,671,509 B1* | 6/2020 | Thompson | | G06Q 10/06315 |
| 11,561,927 B1* | 1/2023 | Neilsen | | G06F 16/214 |
| 11,810,056 B1* | 11/2023 | Eccles | | G06Q 10/087 |
| 2007/0058547 A1* | 3/2007 | Berstis | | G06F 9/5072 |
| | | | | 370/232 |
| 2007/0094002 A1* | 4/2007 | Berstis | | H04L 41/145 |
| | | | | 703/22 |
| 2007/0094662 A1* | 4/2007 | Berstis | | G06F 9/505 |
| | | | | 718/102 |
| 2007/0118839 A1* | 5/2007 | Berstis | | G06F 9/5072 |
| | | | | 718/105 |
| 2013/0067123 A1* | 3/2013 | Rizzo | | G06F 3/0635 |
| | | | | 710/22 |
| 2013/0067125 A1* | 3/2013 | Rizzo | | G06F 13/12 |
| | | | | 710/38 |
| 2014/0297733 A1* | 10/2014 | Wang | | G06F 3/0604 |
| | | | | 709/203 |
| 2014/0344532 A1* | 11/2014 | Lazier | | G06F 11/0727 |
| | | | | 711/154 |
| 2017/0004445 A1* | 1/2017 | Lazier | | G06Q 10/0835 |
| 2017/0178069 A1* | 6/2017 | Paterra | | G06F 21/44 |
| 2018/0285369 A1* | 10/2018 | Lazier | | H04L 9/0894 |
| 2018/0324085 A1* | 11/2018 | Doane | | H04L 45/42 |
| 2018/0365119 A1* | 12/2018 | Lazier | | G06F 11/1076 |
| 2019/0173941 A1* | 6/2019 | Puchala | | H04L 47/125 |
| 2019/0303862 A1* | 10/2019 | Bollinger | | G06F 3/0482 |
| 2020/0401329 A1* | 12/2020 | Watson | | G06F 3/0614 |
| 2021/0165840 A1* | 6/2021 | Kotla | | G06F 9/45558 |
| 2021/0182410 A1* | 6/2021 | Paterra | | G06Q 10/06314 |

* cited by examiner

DYNAMIC PHYSICAL DATA TRANSFER ROUTING

CROSS-REFERENCE TO RELATED APPLICATION

This application is a continuation of U.S. patent application Ser. No. 16/809,169, filed Mar. 4, 2020, entitled "DYNAMIC PHYSICAL DATA TRANSFER ROUTING," the disclosures of which are incorporated herein by reference in their entirety.

BACKGROUND

As the generation of data is ever increasing, storing and accessing that data is becoming more complex. The transfer of large amounts of data presents many technical and logistical challenges. In some cases, a customer may desire to store a large amount of data with a computing resource service provider, such as with or through a data storage service. In some circumstances, in order to store the data, the data is transferred to a physical facility having physical computing resources (e.g., servers, etc.) of the computing resource service provider. Complicating this aim, however, is the fact that there may be many potential network paths that may be utilized to transfer the large amount of data from the customer to the computing resource service provider. Other complications may arise when a customer site has limited network connectivity to transport the data.

BRIEF DESCRIPTION OF THE DRAWINGS

Various techniques will be described with reference to the drawings, in which.

DETAILED DESCRIPTION

Figure 1:
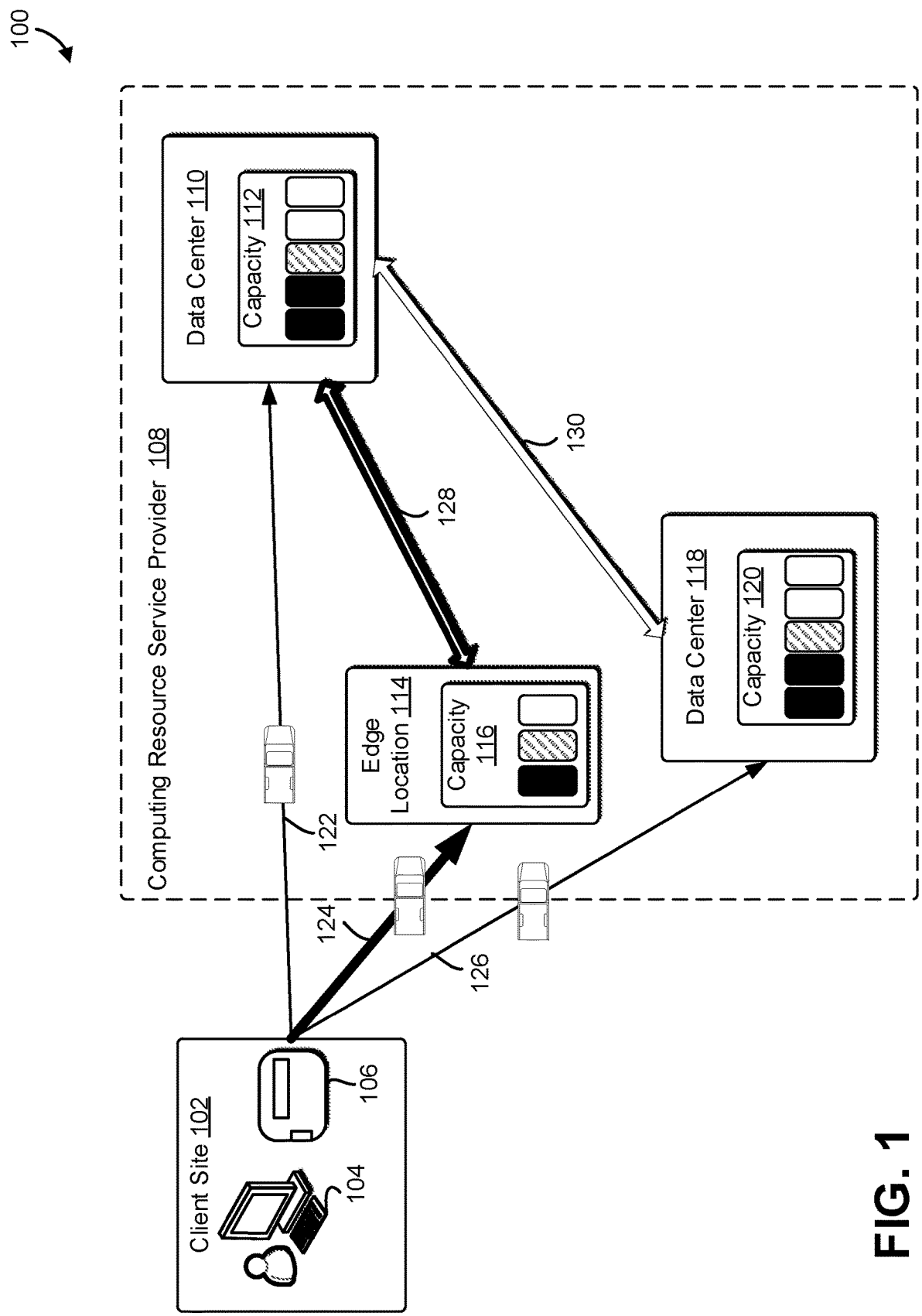
FIG. 1 illustrates an example environment in which dynamic routing of data may be utilized, according to at least one embodiment.

Systems and methods are described herein for routing large amounts of data by transferring a physical storage device for at least part of a route between source and destination locations. In one example, a customer may desire to load a large amount of data into a data storage service, such as may be provided by a computing resource service provider. In some cases, the customer may be remote from a data center or edge location of the computing resource service provider, which may be capable of uploading the data or transferring the data over one or more networks to a data center which can upload the data to a desired storage location. Using the described techniques, a number of factors may be considered and used to select a route, which includes a physical path for a physical storage device to travel, a network path for the customer data to be transferred on, or a combination thereof, to reduce the overall time to transfer the customer data from a source location (e.g., a customer end point) to a given data center or other desired destination location. The factors considered to select different paths to the route may include latency, shipping time, delays thereof, capacity information of a data center or edge location to process/transfer the data, expected capacity, and other factors.

In some aspects, the physical storage device may be equipped with an electronic shipping label, such that the route information/next location may be programmed into the electronic shipping label. In some cases, a customer may request a physical storage device to transfer data, and at that point the route may be determined. The physical storage device may be loaded with route information and then be shipped to the customer site. The customer may load the data and ship the physical storage device to the first location in the route according to the shipping label. In some case, this may enable a customer to upload data when the customer itself does not have a network connection that will support the transfer of a large amount of data. In some cases, the route may be reconfigured at any point or time while it is in route, such as to account for changing conditions, including changes to shipping carrier delays or times, changes to capacity of the network or computing resource center locations, and so on.

In some cases, the routing may be provided as or by a service. A customer may obtain a physical storage device, load their data onto the device, and select an option to schedule a pickup. A request may then be made back to the service requesting a shipping label, which may also trigger an optimization decision/route determination. In some examples, the service may obtain as input: the current device capacity; the current capacity of the data center; the capacity of other upload edge locations; the current estimated completion time of current processing jobs; the network connection transfer latency; and any other factor effecting throughput of the transportation network. Using these inputs, the service may compute which location will process the transfer job fastest accounting for all known bottlenecks and capacity limitations. The service can then select between one or more configured destination locations when deciding which location to select. Once a decision is made, a shipping label will be generated to route the physical storage device to the optimal location. The first location in the route will be returned to the customer and may displayed on the physical storage device as a shipping label. In some cases, the customer may not be aware of this process, and can simply drop the device off at the shipping location or await pickup, as the scenario may dictate.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more efficient transfer of large amounts of data, 2) reduced latency or time in transferring large amounts of data between two physically separate locations, and/or 3)

reduced network utilization to transfer large amounts of data, among other benefits and advantages, as will be described throughout the disclosure.

FIG. 1 illustrates an example 100 of dynamic physical data transfer routing, according to at least one embodiment. Specifically, FIG. 1 depicts a client site 102, a client device 104, and a data storage device 106, some or all of which may be connected by one or more networks. The client device 104 may desire to upload data to the computing resource provider 108. In some cases the uploading of data may be facilitated more efficiently using a physical data storage device 106. The computing resource provider 108 may include any number of sites or physical locations, such as a data center 110 with a capacity 112, an edge location 114 with a capacity 116, and a data center 118 with a capacity 120. Individual locations 110, 114, 118 may be connected through one or more network or physical paths, such as a physical path 122, a physical path 124, a physical path 126, a network path 128, and a network path 130, each of which may represent various paths the data/data storage device 106 may be transferred over.

In various embodiments, the client device 104, which may co-located or otherwise associated with a client site 102, may be any entity operable to access various systems and/or services such as the computing resource service provider 108. The client device 104 may be any suitable computing device, such as one or more instances of a physical computing instance (e.g., a physical server computer, a mobile communication device, a laptop computer, a tablet computer, a personal computer, a mainframe, etc.), one or more instances of a virtual computing instance, such as a virtual machine hosted on one or more computer servers, and/or other variations thereof. The client device 104 may be located in the client site 102, which may be a physical location of the client device 104. In some examples, the physical location of the client device 104 may refer to a geographic location or region where the client device 104 may be located, and may be defined by two coordinates (e.g., a longitude value and a latitude value). The client device 104 may be utilized by a customer of the computing resource service provider 108 to access and interact with the computing resource service provider 108.

The computing resource service provider 108 may be a service provider that may provide various services such as data processing, data storage, software applications, security, encryption, and/or other such services. The computing resource service provider 108 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 108 may provide data storage services for data, including large volumes of data. The computing resource service provider 108 may provide a large-scale data transport service in which customers of the service may provide the service with large volumes of data to be stored by the computing resource service provider 108. Data may be provided to the large-scale data transport service through physical data storage devices, such as device 106, which may be shipped, through various shipping services/carriers, to one or more locations accessible by the computing resource service provider 108. The computing resource service provider 108 may comprise various data centers and locations, which may be utilized to transport and/or store data, interact with customers, and perform a variety of other functions. The data center 110, edge location 114, and data center 118 may be physical locations that may be utilized to store large amounts of data on behalf of the computing resource service provider 108. The data center 110, edge location 114, and data center 118 may comprise various computer systems, data storage devices, data communications connections, and/or variations thereof, which may be configured to store data and perform other operations on behalf of or in connection with the computing resource service provider 108.

The computing resource service provider 108 may receive requests for the storage of data from the client device 104. The client device 104 may submit a request to store data to the computing resource service provider 108 through one or more communication networks, such as the Internet. The request may specify a specific data center in which the client device 104 may desire to store the data. In some examples, the client device 104 may desire to store the data in the data center 110. In other cases, the client device may wish to store data with the computing resource service provider 108, and may not designate a specific data center. In this circumstance, a data center may be chosen based on a variety of factors, such as proximity to the client site 102, available capacity to process a client request, etc. The client device 104 may provide the data utilizing the data storage device 106. In some examples, the client device 104 may be provided with the data storage device 106 from the computing resource service provider 108 and store the data within the data storage device 106. In various examples, the data storage device 106 may be obtained by the client device 104 from various other systems or services. The data storage device 106 may provide non-transitory persistent (non-volatile) storage for program and data files, and may include one or more of magnetic media (e.g., hard disk drive, a floppy disk drive along with associated removable media), optical media (e.g., compact disc (CD), a digital versatile disc (DVD), Blu-ray disc, etc.), flash memory (e.g., solid-state drive, etc.), holographic data storage, and other like storage media. In some examples, the data storage device 106 may comprise an electronic shipping label, which may display shipping labels provided by the computing resource service provider 108.

The computing resource service provider 108 may analyze each of the data center 110, edge location 114, and data center 118. The computing resource service provider 108 may determine the capacity of each of the data center 110, edge location 114, and data center 118. In some examples, capacity may refer to the data storage capacity of a particular data center, edge location, data storage center, and/or variations thereof. The capacity may indicate how much data storage is available within a particular data center, edge location, data storage center, and/or variations thereof, the ability to process and ship a physical storage device 106, and/or the ability to process and transmit data over a network. Referring to FIG. 1, capacity may be depicted in various ways which may denote specific characteristics of the capacity. For example, capacity depicted as a solid colored block may indicate no available capacity (e.g., used capacity), capacity depicted as a shaded block may indicate reserved capacity, or capacity that is available but is unable to be utilized, and capacity depicted as a white block may indicate available capacity that may be utilized. The computing resource service provider 108 may also determine the transfer times for each of the physical paths 122-126 and the network paths 128-130. In some examples, the physical paths 122-126 may represent the physical shipping paths of a data storage device being shipped from the client site 102 to various locations. The physical path 122 may represent a physical path utilized by a shipping service to ship a data storage device from the client site 102 to the data center 110, the physical path 124 may represent a physical path utilized by a shipping service to ship a data storage device from the client site 102 to the edge location 114, and the physical path 126 may represent a physical path utilized by a shipping service to ship a data storage device from the client site 102 to the data center 118.

In some examples, the network paths 128-130 may represent network paths of data being transferred between respective locations. The network path 128 may represent a communication network, such as a fiber optic network or the like, between the edge location 114 and the data center 110 that may be utilized to transfer data, such as data stored within a data storage device. The network path 130 may represent a communication network between the data center 118 and the data center 110 that may be utilized to transfer data. In various embodiments, the physical paths 122-126 and the network paths 128-130 may be associated with transfer times that may be required to transfer data across a particular path. For example, it may take less time for a data storage device to be shipped from the client site 102 to the edge location 114 then for a data storage device to be shipped from the client site 102 to the data center 110. As another example, it may take less time for data to be transferred across the network path 128 between the edge location 114 and the data center 110 than for data to be transferred across the network path 130 between the data center 118 and the data center 110.

The computing resource service provider 108 may associate a cost function with the transfer times across the physical paths 122-126 and the network paths 128-130. The cost function may be based at least on the transfer times, as well as other various factors such as the reliability or variability of certain locations/paths, the monetary costs of utilizing various paths between certain locations, capacity information, and/or variations thereof. The computing resource service provider 108 may determine a cost of each path that the data storage device 106 may take to reach the data center 110, in which the cost may represent at least the overall time the data storage device 106 may take to transfer over a particular path. The computing resource service provider 108 may determine paths from the client site 102 to the data center 110 with the least cost, and update the electronic shipping label of the data storage device 106 such that the data storage device 106 may utilize the paths with the lowest costs to transfer from the client site 102 to the data center 110. For example, the computing resource service provider 108 may determine that the lowest cost path for the data storage device 106 from the client site 102 to the data center 110 is utilizing the physical path 124 to the edge location 114 and then the network path 128 to the data center 110. Continuing with the example, the computing resource service provider 108 may update the electronic shipping label of the data storage device 106 such that, upon transfer of the data storage device 106 to a shipping service/carrier, the data storage device 106 may be shipped across the physical path 124 to the edge location 114, where it may be transmitted over the network path 128 to the data center 110.

Figure 2:
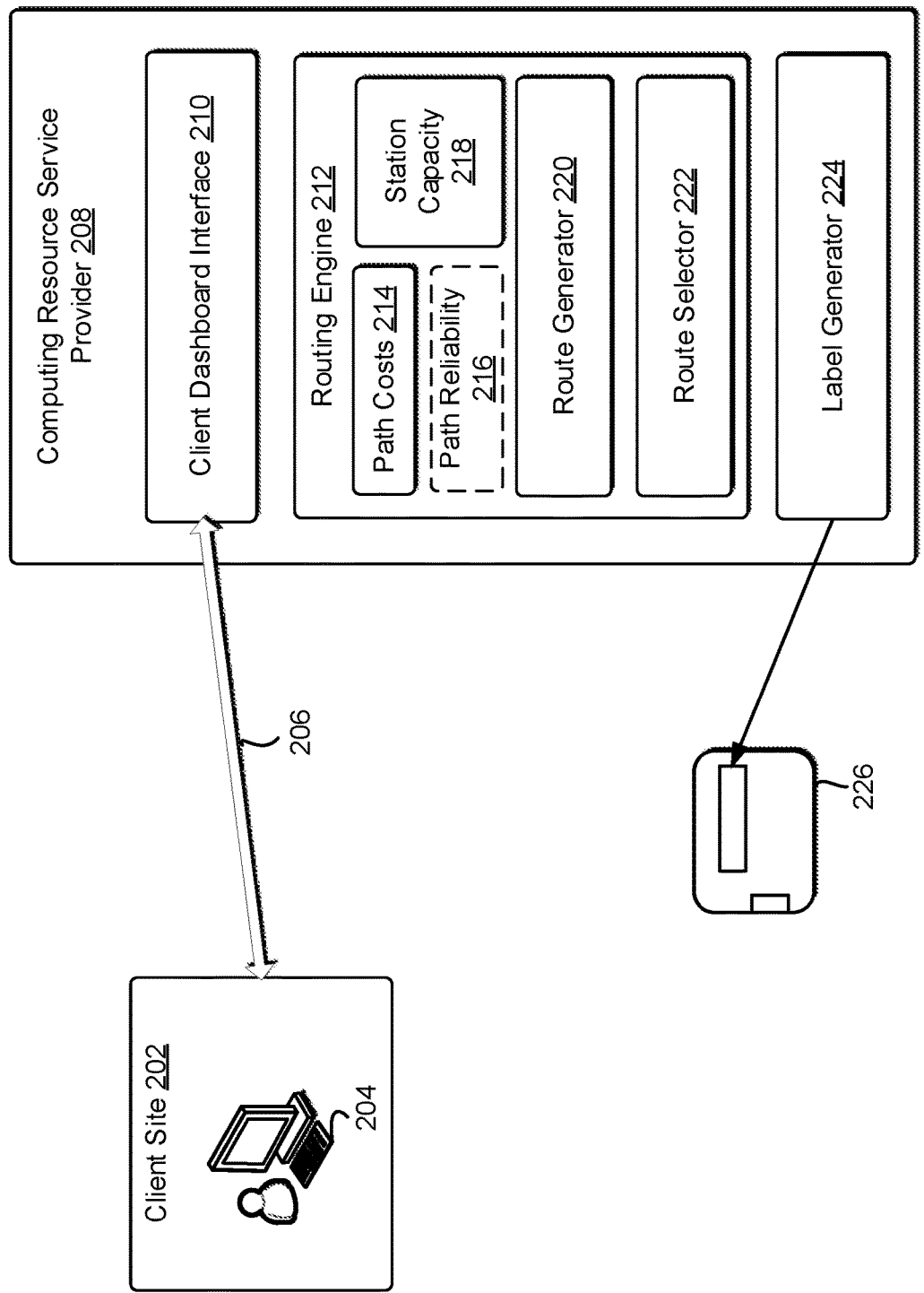
FIG. 2 illustrates an example computing resource service provider that may determine a data routing path, according to at least one embodiment.

FIG. 2 illustrates an example 200 of a computing resource service provider 208 interacting with a client site 202. Specifically, FIG. 2 depicts a client device 204 which may be located at a client site 202. The client device 204 may interact, through a communication network 206, with a computing resource service provider 208, which may include a client dashboard interface 210, a routing engine 212, and a label generator 224, which may generate shipping labels for a data storage device 226. The routing engine 212 may further include a path cost component 214, a path reliability component 216, a station capacity component 218, a route generator 220 and a route selector 222, In various embodiments, the client device 204, the client site 202, the data storage device 226, and the computing resource service provider 208 may be examples of or include one or more aspects of the client device 104, the client site 102, the data storage device 106, and the computing resource service provider 108, respectively, as described in connection with FIG. 1.

The computing resource service provider 208 may provide a large-scale data transport service in which customers of the service may provide the service with large volumes of data to be stored by the computing resource service provider 208. In some examples, data may be provided to the large-scale data transport service through physical data storage devices, which may be shipped to one or more locations accessible by the computing resource service provider 208 through various shipping services. In various embodiments, the computing resource service provider 208 may comprise various data centers, edge locations, data storage centers, and/or variations thereof, which may be utilized to transport and/or store data, in which data may be transferred between the locations physically, such as through a shipping service/carrier, or through various communication networks, such as a fiber optic network. In some examples, there may be transfer times associated with each data transfer path.

The client device 204 may utilize the client dashboard interface 210 to interact with the computing resource service provider 208. In various embodiments, the client device 204 may utilize the communication network 206, which may be a secure communications network that may be usable to access the services of the computing resource service provider 208, to interact with the computing resource service provider 208. The client device 204 may submit a request to the computing resource service provider 208 to store data. In various examples, in response to the request, the computing resource service provider 208 may provide the data storage device 226 to the client device 204, in which the client device 204 may store the data in the data storage device 226. The data storage device 226 may comprise an electronic shipping label. In some examples, the electronic shipping label may be an electronic ink or electronic paper display that may be configured remotely by the computing resource service provider 208. In some examples, the client device 204 may utilize the client dashboard interface 210, which may comprise various user interfaces that may provide access to the computing resource service provider 208, to submit the request to the computing resource service provider 208. The request may indicate the size of the data to be stored, a desired location of the data, the location of the client site 202, and various other aspects of the data to be stored.

Upon receipt of the request, the computing resource service provider 208 may then utilize the routing engine 212 to determine a route for the data storage device 226 to the desired location. The routing engine 212 may utilize the path costs 214, which may be a component of the routing engine 212 that may analyze potential data transfer paths and determine the costs of the potential paths. The path costs 214 may analyze each potential path the data of the data storage device 226 may utilize to reach the desired location from the client site 202. In some examples, the path costs 214 may analyze physical paths, such as a physical path the data storage device 226 may be shipped/transferred over, or network paths, such as a network path the data of the data storage device 226 may be transmitted/transferred over. The path costs 214 may determine the time required for transfer over each potential path. The routing engine 212 may also utilize the station capacity 218, which may be a component of the routing engine 212 that may determine the capacity of each location of the computing resource service provider 208. In some examples, capacity may refer to the data storage capacity of a particular data center, edge location, data storage center, and/or variations thereof. The capacity may denote how much data storage is available within a particular data center, edge location, data storage center, and/or variations thereof. In yet some cases, the capacity may indicate processing capabilities to transfer data over a network, capabilities to process a data storage device 226, etc.

The routing engine 212 may also utilize the path reliability 216, which may be a component of the routing engine 212 that may determine the reliability of each potential path. In some examples, reliability may be expressed as a value, in which higher values may indicate a higher reliability and lower values may indicate a lower reliability. Reliability may be expressed as a value between 0 and 1, in which a 1 may represent the highest reliability and a 0 may represent the lowest reliability. Reliability may refer to the consistency and accuracy of a particular path such that a path with low reliability may be a path that is prone to delays, failures, and/or other various problems, and a path with high reliability may be a path that is generally not prone to delays, failures, and/or other various problems. The routing engine 212 may utilize the route generator 220, which may be a component of the routing engine 212 that may generate potential routes that the data may utilize to traverse one or more network and/or physical paths to reach the desired location. The route generator 220 may analyze each data transfer path, and generate all potential routes comprising various combinations of the potential data transfer paths from the client site 202 to the desired location. The routine engine 212 may then utilize the route selector 222, which may be a component of the routing engine 212 that may select a route based on various factors, to select the route of the potential routes with the lowest cost, highest reliability, and available capacity. The route selector 222 may utilize cost information, reliability information, and station capacity information, which may be provided by the path costs 214, the path reliability 216, and the station capacity 218, respectively, to determine the route.

Upon determination of the route the data storage device 226 may utilize to transfer to the desired location, the computing resource service provider 208 may cause the label generator 224 to generate a shipping label based on the determined route and update the electronic shipping label of the data storage device 226 with the generated shipping label. The computing resource service provider may then initiate a process to have a suitable (e.g., enough capacity) storage device 226 sent to the client site 202. The client device 204, after uploading desired data to the data storage device 226, may deposit the data storage device 226 with a suitable shipping service/carrier, where the data storage device 226 may be shipped and transferred according to the determined route. In some examples, the electronic shipping label may change dynamically based on the location of the data storage device 226, new information, and/or other various factors.

For example, the determined route may comprise various physical locations in which the data storage device 226 may be shipped to a first physical location, then to a second physical location, and then to the desired location to complete the determined route. Continuing with the example, the electronic shipping label may first indicate the first physical location, then, upon shipment of the data storage device 226 to the first physical location via a shipping service, the electronic shipping label may update to indicate the second physical location, which may be utilized by a shipping service to ship the data storage device 226 from the first physical location to the second physical location. Further continuing with the example, upon shipment of the data storage device 226 to the second physical location, the electronic shipping label may update to indicate the desired location, which may be utilized by a shipping service to ship the data storage device 226 to the desired location thus completing the determined route.

As another example, the determined route may comprise various physical locations in which the data storage device 226 may travel to a first physical location, then to a second physical location, and then to the desired location to complete the determined route. Continuing with the example, the electronic shipping label may first indicate the first physical location. Further continuing with the example, upon shipment of the data storage device 226 to the first physical location via a shipping service, the electronic shipping label may receive information that may indicate that the second physical location is no longer the most viable location, and a third physical location has been determined that may be more viable such that the determined route may be made more cost efficient and reliable by replacing the second physical location with the third physical location. Further continuing with the example, the electronic shipping label may update to indicate the third physical location, which may be utilized by a shipping service to ship the data storage device 226 from the first physical location to the third physical location; upon shipment of the data storage device 226 to the third physical location, the electronic shipping label may update to indicate the desired location, which may be utilized by a shipping service to ship the data storage device 226 to the desired location thus completing the determined route. In various embodiments, the determined route may be the lowest cost and highest reliability route for the data storage device 226 from the client site 202 to the desired location.

Figure 3:
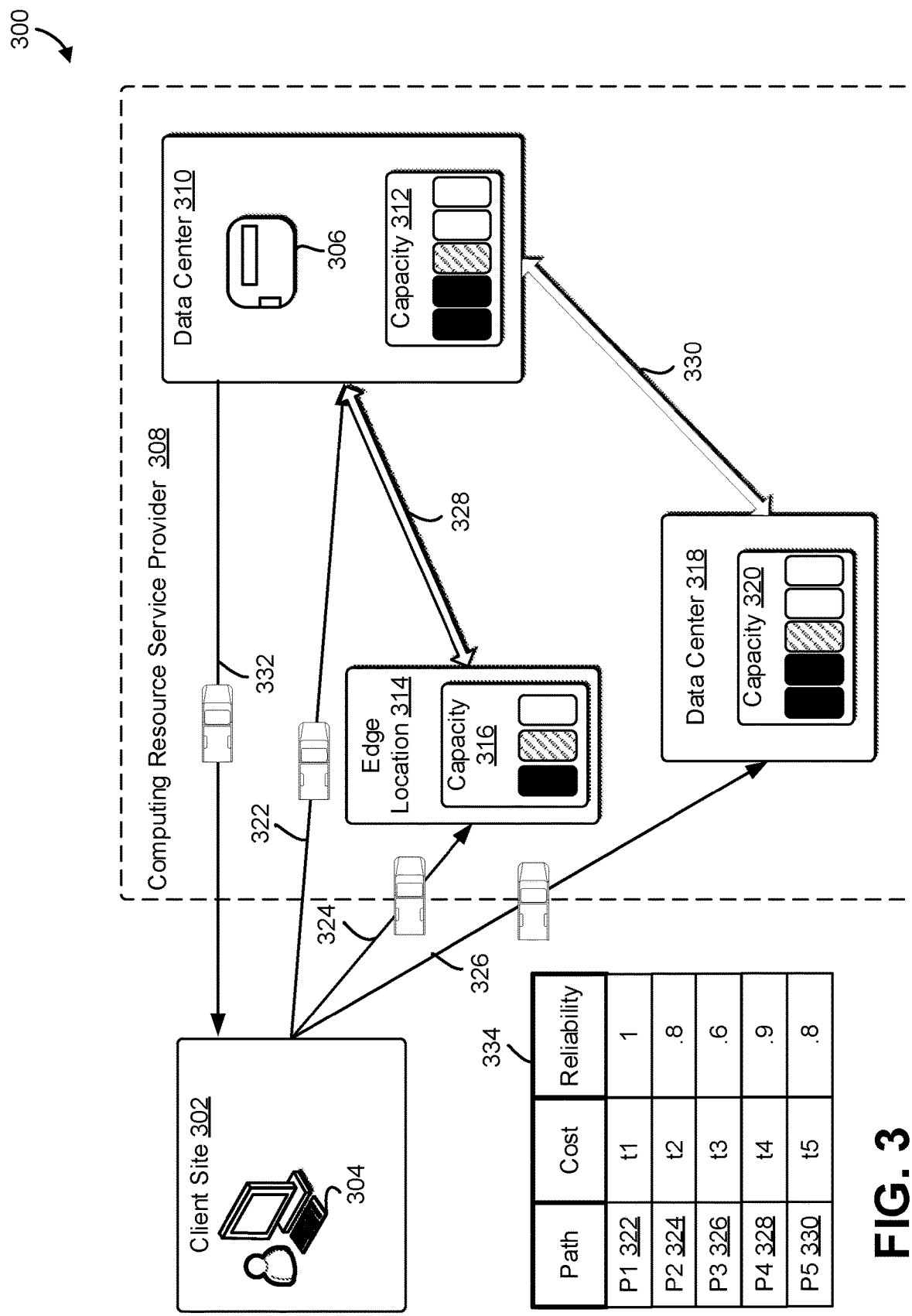
FIG. 3 illustrates another example of dynamic physical data transfer routing, according to at least one embodiment.

FIG. 3 illustrates an example 300 of dynamic physical data transfer routing, according to at least one embodiment. Specifically, FIG. 3 depicts a client site 302, a client device 304, a data storage device 306, and a computing resource service provider 308, which includes a data center 310, an edge location 314, and a data center 318, which may be an example of or include one or more aspects of the client site 102, 202 the client device 104, 204 the data storage device 106, the computing resource service provider 108, 208 the data center 110, the edge location 114, and the data center 118, respectively, as described in connection with FIGS. 1 and 2. In various embodiments, physical paths 322-326 and 332, and network paths 328-330, may be utilized to transfer data between various locations.

In the example illustrated in FIG. 3, the computing resource service provider 308 may calculate potential routes from the client site 302 to the data center 310 after the client site 302 has submitted a request to store a large volume of data within the data center 310. The client device 304 may submit the request to the computing resource service provider 308, and the request may indicate that the large volume of data is to be stored within the data center 310. The computing resource service provider 308 may, in response to the request, provide the data storage device 306 to the client device 304 such that the client device 304 may utilize the data storage device 306 to store the large volume of data. In the illustrated example, the computing resource service provider 308 may provide the data storage device 306 to the client device 304 from the data center 310. In other examples, any suitable data storage device, which may be located at other locations, may be identified by the computing resource service provider 308 to send to the client site 302.

The computing resource service provider 308 may determine possible paths to generate one or more routes from the client site 302 to the data center 310 that may be utilized to transfer the data storage device 306 to the data center 310 after it has arrived at the client site 302 and the client device 304 has stored the large volume of data in the data storage device 306. The computing resource service provider 308 may analyze each of the data center 310, the edge location 314, and the data center 318. The computing resource service provider 308 may analyze the physical paths 322-326 and the network paths 328-330. The computing resource service provider 308 may analyze various factors associated with the physical paths 322-326, such as available shipping services/carriers, reliabilities of available shipping services, shipping service times, and/or variations thereof. The computing resource service provider 308 may additionally analyze various factors associated with the network paths 328-330, such as available network providers, reliabilities of available network providers, network transmission times, and/or variations thereof. The computing resource service provider 308 may also analyze the capacities of the various locations, such as capacities 312, 316, and 320 of data center 310, edge location 314, and data center 318, respectively, to determine which locations can be utilized, and which locations with full capacity may not be utilized.

The computing resource service provider 308 may generate a table 334 or other data structure based on the analyses in the process of determining a route. It should be appreciated that the computing resource service provider 308 may determine a route or routes without generating a table 334, such that the table may be exemplary of a process for determining a route. The table 334 may comprise data relating to the costs and reliabilities of the physical paths 326-332 and the network paths 328-330. In some embodiments, cost may be expressed as a value of time that may denote the time taken to transfer over a particular path. Reliability may be expressed as a value between 0 and 1, or over another range of values. In this example, a reliability of 0 may represent the path with the lowest reliability and a path with a reliability of 1 may represent the path with the highest reliability. In various embodiments, reliability may be measured based on a pre-defined scale. For example, a path with a reliability value of 0 may correspond to a path that is prone to at least a certain amount of delays, and a path with a reliability value of 1 may correspond to a path that is prone to a certain maximum amount of delays. In some examples, values of reliability may be determined for paths by comparing the paths to other paths; a path with a reliability value higher than a reliability value of a different path may indicate that the path is more reliable than the different path.

The computing resource service provider 308 may utilize the table 334 to determine the best route for the data storage device 306 from the client site 302 to the data center 310. In some examples, the best route may be the route that has the lowest cost and highest reliability. For example, the computing resource service provider 308 may, through the table 334, determine that the physical path 324 and the network path 328 form the best route. Continuing with the example, the computing resource service provider 308 may determine that the combined cost of the physical path 324 and the network path 328 is the lowest of any potential route from the client site 302 to the data center 310 comprising any variation of the physical paths 322-326 and the network paths 328-330, and the combined reliability of the physical path 324 and the network path 328 is the highest of any of the potential routes.

Figure 4:
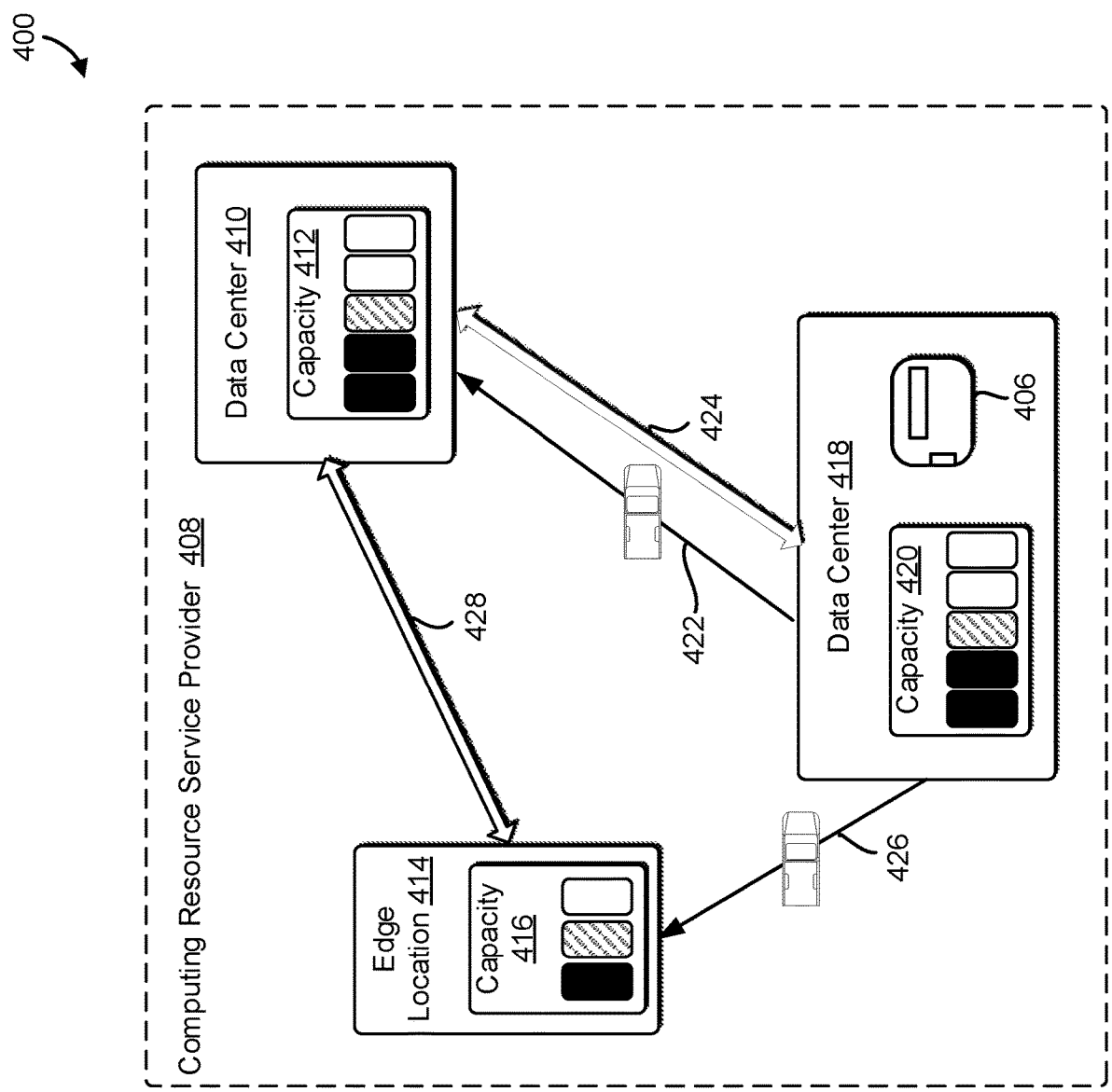
FIG. 4 illustrates another example of dynamic physical data transfer routing, according to at least one embodiment.
Figure 4:
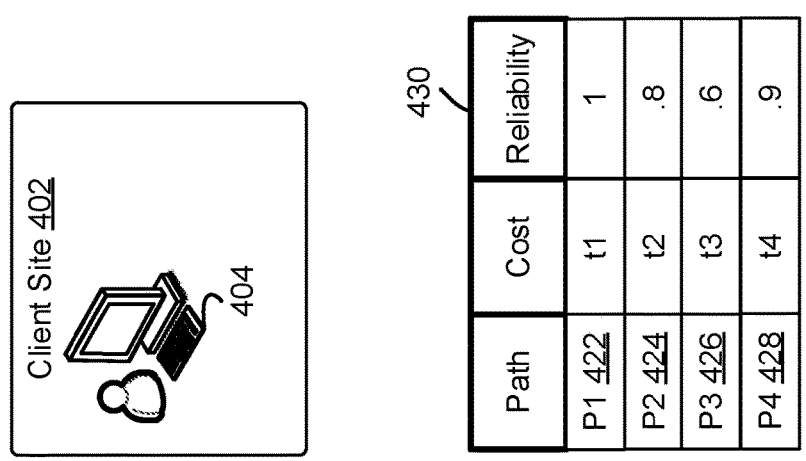

FIG. 4 illustrates an example 400 of dynamic physical data transfer routing, according to at least one embodiment. Specifically, FIG. 4 depicts a client site 402, a client device 404, a data storage device 406, a computing resource service provider 408 including a data center 410, an edge location 414, and a data center 418, which may be examples of or incorporate one or more aspects of similarly named components or entities described above. In various embodiments, physical paths 422 and 426, and network paths 424 and 428, may be utilized to transfer data between various locations.

In the example illustrated in FIG. 4, the computing resource service provider 408 may dynamically re-calculate costs of paths between a location of the data storage device 406 and a final destination, while the data storage device 406 is in route to the destination. The client device 404 have submit a request to store a large volume of data within the data center 410. The client device 404 may subsequently obtain the data storage device 406 from the computing resource service provider 408, and store the large volume of data in the data storage device 406. The computing resource service provider 408 may have calculated an initial route from the client site 402 to the data center 410. In some examples, the initial route may comprise the data storage device 406 first transferring physically to the data center 418 from the client site 402, then transferring over the network path 424 to the data center 410. The client device 404 may perform one or more processes to cause the data storage device 406 to be transferred to the data center 418.

Upon arrival of the data storage device 406 at the data center 418, the computing resource service provider 408 may determine that there potentially may be alternative and more efficient paths/routes for the data storage device 406 to transfer to the data center 410 than the initial route determined. The computing resource service provider 408 may determine the available paths for the data storage device 406 from the data center 418 to the data center 410, such as may be represented by table 430. The table 430 may include data relating to the costs and reliabilities of the paths 422-428. The computing resource service provider 408 may utilize the table 430 to determine new paths that may be utilized by the data storage device 406 to transfer to the data center 410. For example, the initial route may have required the data storage device 406 to be transferred over the network path 424 to the data center 410. Continuing with the example, the computing resource service provider 408 may determine, through the table 430, that it may be more reliable and efficient to transfer the data storage device 406 across the physical path 422 to the data center 410. In some cases, the computing resource service provider 408 may take into account existing or updated capacities of various stations of the computing resource service provider 408, such as capacities 412, 416, and 420 of data center 410, edge location 414, and data center 418, to confirm or modify an existing route. Further continuing with the example, the computing resource service provider 408 may update an electronic shipping label of the data storage device 406 accordingly such that the data storage device 406 is not transferred over the network path 424 to the data center 410 and is instead transferred over the physical path 422 to the data center 410. In various examples, the computing resource service provider 408 may update the electronic shipping label of the data storage device 406 to utilize any one of the paths 422-428 to transfer to the data center 410.

Figure 5:
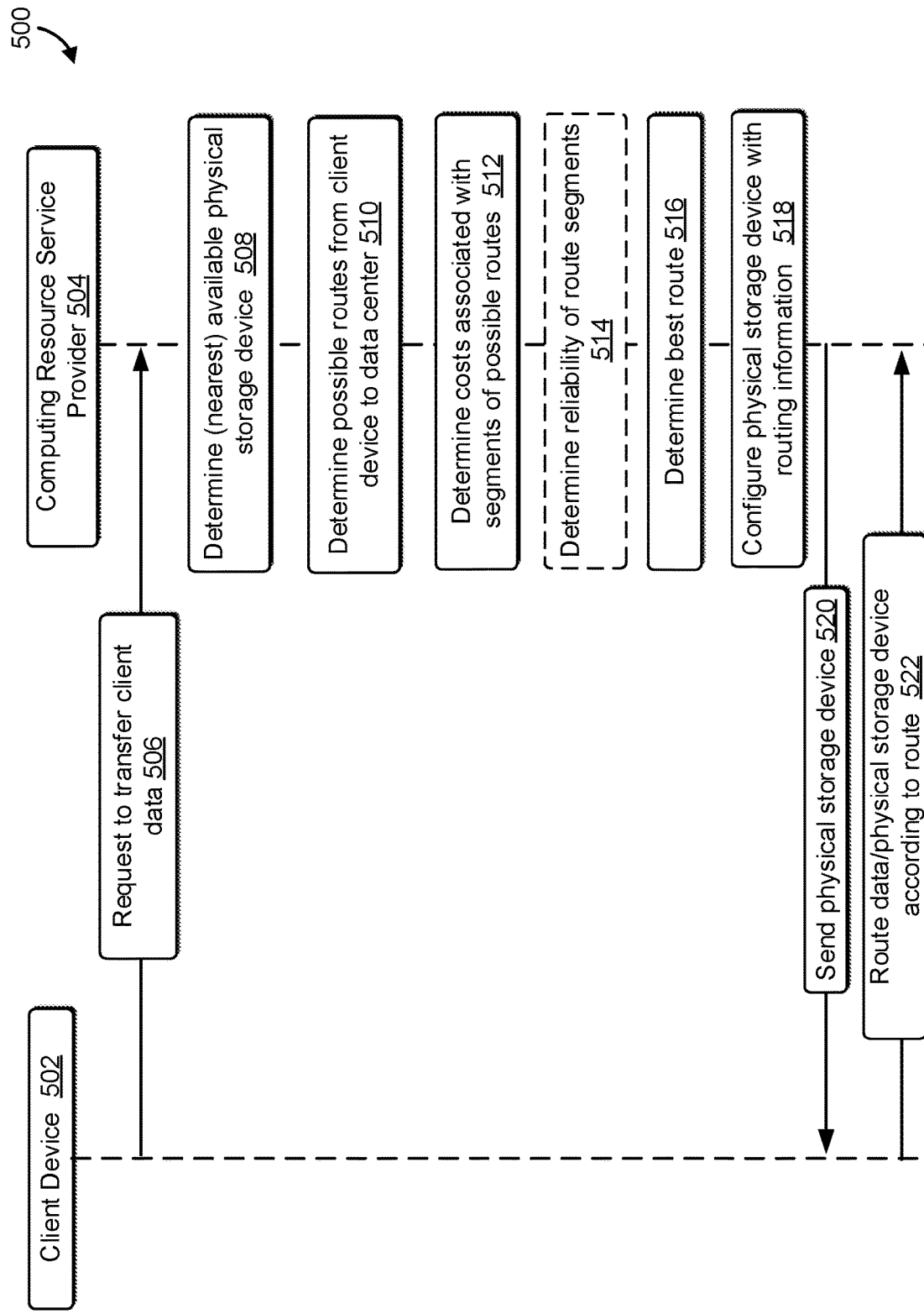
FIG. 5 illustrates example communications between a client device and a computing resource service provider for routing data, according to at least one embodiment.

FIG. 5 illustrated communications and operations 500 performed by a client device 502 and a computing resource service provider 504 for routing physical data, in accordance with various embodiments. Client device 502 and the computing resource service provider 504 may be examples of or include one or more aspects of similarly named entities described above.

The client device 502 may request 506 to transfer client data. The client device 502 may submit a request to the computing resource service provider 504. In some examples, the client device 502 may utilize one or more communications networks to submit the request. The request may be formatted as an application programming interface request. In various examples, the client device 502 may utilize one or more interfaces that may be provided by the computing resource service provider 504 to submit the request. The request may indicate a location of the client device 502, the size of the client data, as well as various other characteristics of the client data. The request may additionally indicate a desired data center of the computing resource service provider 504 that the client device 502 may desire to store the client data in, a desired or required time to complete the transfer, or other information.

The computing resource service provider 504 may receive the request, and determine at operation 508 the nearest available physical storage device. In some examples, the computing resource service provider 504 may determine the physical storage device from a plurality of physical storage devices. The nearest available physical storage device may be the physical storage device that is most easily obtained by the computing resource service provider 504. In some examples, the physical storage device may comprise an electronic shipping label that may be configured dynamically by the computing resource service provider 504. The computing resource service provider 504 may then determine at operation 510 possible routes from the client device to the desired data center. The possible routes may include various physical and network paths data may be transferred over from the client device 502 to the desired data center. The computing resource service provider 504 may determine various paths or segments between various data centers, locations, stations, and/or variations thereof of the computing resource service provider 504, and determine the potential routes from the client device 502 to the desired data center.

The computing resource service provider 504 may determine at operation 512 costs associated with segments of possible routes. In some examples, a cost may refer to the time required for data of the physical storage device to transfer over or traverse a particular segment or path. The computing resource service provider 504 may additionally (optionally) determine at operation 514 the reliability of the route segments. In some examples, reliability may refer to the consistency and accuracy of a particular route segment such that a route segment with low reliability may be a route segment that is prone to delays, failures, and/or other various problems, and a route segment with high reliability may be a route segment that is generally not prone to delays, failures, and/or other various problems.

The computing resource service provider 504 may determine at operation 516 a best route. In various embodiments, the best route may be a route of the possible routes that has the least cost and highest reliability. In some examples, any criteria may be utilized to determine the best route. For example, the best route may be the route with the least cost and average reliability. In various examples, the best route may be the route with the highest reliability and average cost. The computing resource service provider 504 may then configure at operation 518 the physical storage device with routing information. The routing information may indicate which locations data of the physical storage device may be transferred to as part of the best route. The computing resource service provider 504 may configure the electronic shipping label of the physical storage device with various locations indicated by the routing information. The computing resource service provider 504 may provide or send 520 the physical storage device with the routing information to the client device 502. The client device 502 may receive the physical storage device, and route 522 the data/physical storage device according to the route. In some examples, the client device 502 may receive the physical storage device, store the client data in the physical storage device, and transfer the physical storage device to a shipping service/carrier that may route the physical storage device according to the routing information, which may be indicated by the electronic shipping label of the physical storage device.

Figure 6:
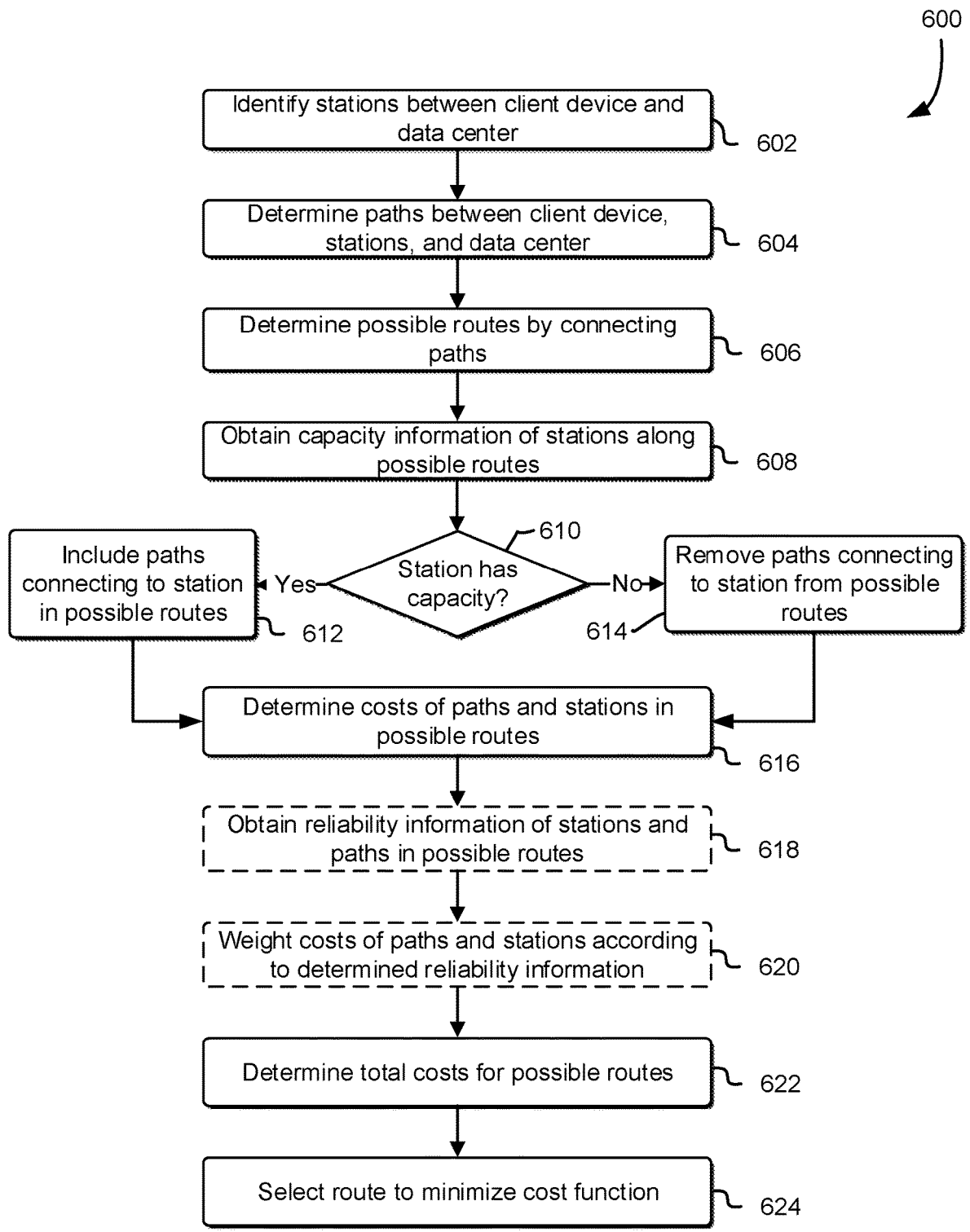
FIG. 6 illustrates an example process for dynamic data transfer routing, according to at least one embodiment.

FIG. 6 illustrates an example process 600 for determining a route, in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). In some examples, one or more operations of process 600 may be performed by computing resource service provider 108, 208, 308, 408, 508, and/or one or more components of routing engine 212 described above. For yet some examples, some or all of process 600 may be performed by any suitable system, such as a server in accordance with those described in connection with FIG. 7.

The system performing the process 600 may first, at operation 602, identify stations between a client device and a data center. The system may receive a request from the client device to transfer client data to the data center. In some examples, the stations may refer to various data storage stations, locations, centers, and/or variations thereof that may exist between the client device and the data center. The system performing the process 600 may determine, at operation 604, paths between the client device, the stations, and the data center. The paths may include physical paths, such as a physical path between two locations that a data storage device may be transferred/shipped over, or network paths, such as a network path that data of a data storage device may be transferred/transmitted over.

The system performing the process 600 may determine, at operation 606, possible routes by connecting one or more of the various paths. The system may connect paths between locations to determine possible routes from the client device to the data center. The possible routes may comprise paths from the client device to various stations to the data center. For example, a possible route may include paths from the client device, to a first station, then to the data center. Continuing with the example, another possible route may include paths from the client device, to a second station, to a third station, then to the data center. The system performing the process 600 may, at operation 608, obtain capacity information of stations along possible routes. The system may analyze the various stations to determine the capacity of the various stations. In some examples, capacity may refer to how much data storage is available within a particular station, processing capabilities to transfer a physical data storage device to another station/shipping carrier, capability to transfer data from a physical storage device to network connected device or system to be transferred over a network to another station, etc. In various embodiments, a station with no capacity may refer to a station that does not have any data storage available to be utilized/no capacity to effectuate a physical or network transfer.

The system performing the process 600 may, for each station, determine if the station has capacity, at operation 610. The system may analyze the hardware of each station to determine if a particular station has capacity. In some examples, each station may include an indicator of the capacity of the particular station. If a station does not have capacity, the system performing the process 600 may remove paths connecting to the station from possible routes, at operation 614. The system may remove all paths connecting to stations that do not have capacity. If a station has capacity, the system performing the process 600 may include paths connecting to the station in possible routes, at operation 612. The system may include all paths connecting to stations that have capacity. The system may then determine costs of paths and stations in the remaining possible routes, at operation 616.

The system performing the process 600 may optionally obtain, at operation 618, reliability information of stations and paths in possible routes. In some examples, reliability information may refer to the consistency and accuracy of a particular station or path such that a station or path with low reliability may be a station or path that is prone to delays, failures, and/or other various problems, and a station or path with high reliability may be a station or path that is generally not prone to delays, failures, and/or other various problems. The system performing the process 600 may optionally weight costs of paths and stations according to determined reliability information, at operation 620. In various embodiments, the costs may be weighted such that costs associated with paths and stations with low reliability are weighted less than costs associated with paths and stations with high reliability.

The system performing the process 600 may determine, at operation 622, total costs for possible routes. The system may utilize the cost function to determine the total costs for possible routes. The cost function may indicate which possible routes have the lowest cost, and in some cases, the highest reliability. In some examples, the cost function may be implemented such that lower cost corresponds to routes with high reliabilities and short transfer times, and higher cost corresponds to routes with low reliabilities and long transfer times. The system performing the process 600 may select, at operation 624, a route to minimize cost function. In some examples, the system may select the route of the possible routes with the highest reliability and lowest transfer time. In various embodiments, the system may select the route based on various factors. For example, the system may first determine routes with the highest reliabilities, then select the route with the lowest transfer time from the routes with the highest reliabilities. As another example, the system may first determine routes with the lowest transfer times, then select the route with the highest reliability from the routes with the lowest transfer times.

In some cases, the selected route may include one or more physical paths. In other cases, the selected route may include a combination of one or more physical paths and one or more network paths. In some situations, it may be more efficient to transfer a large amount of data to first transfer the data over a network connection to a data center or edge location, and then load the data onto a physical storage device, to be shipped on one or more physical paths, to eventually arrive at a desired location. This may be the case where a client site is far away from an edge location or data center but has a high bandwidth network connection, for example. In other cases, a client site may not support a high bandwidth network connection. In this scenario, it may be more beneficial to transfer the data using a physical storage device over a physical path to an edge or data center, and then transfer the data via either or both of one or more physical or network paths.

Figure 7:
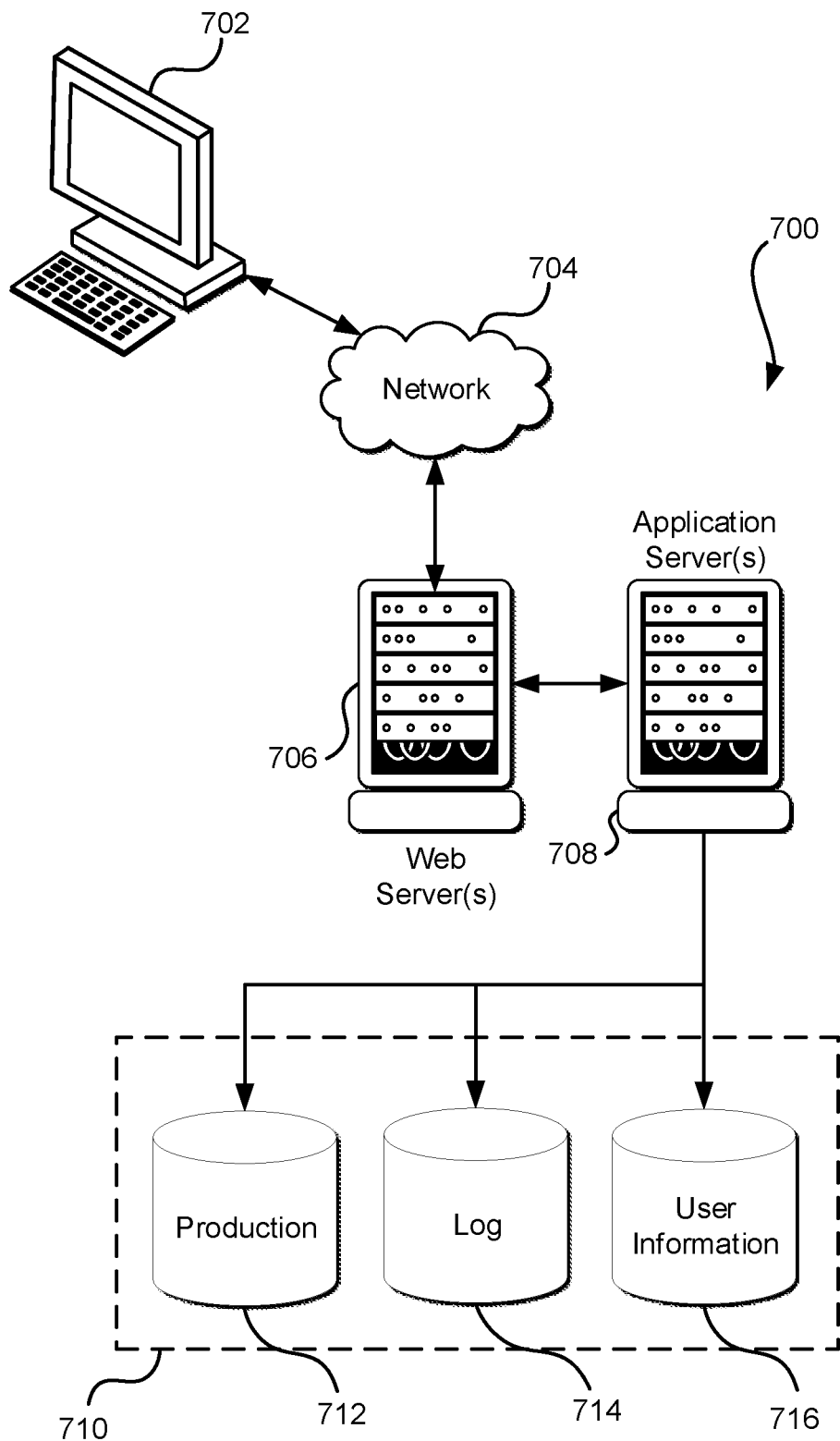
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network.

As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method comprising:
receive, by a computing resource service provider, a request to transfer an amount of data from a customer center to a cloud storage service, wherein the cloud storage service is part of the computing resource service provider that comprises a plurality of physical stations;
in response to receiving the request, cause a physical storage device to be transported to the customer center;
determining, by a routing engine, a route for the amount of data to be uploaded to the cloud storage service from the customer center through at least one of the plurality of physical stations, wherein the route comprises at least one physical path for transferring the physical storage device loaded with the amount of data to the at least one physical station of the plurality of stations, and at least one network path for transferring the amount of data obtained from the physical storage device over a network connection between a pair of physical stations of the plurality of physical stations, wherein determining the route further comprises:
selecting, by the routing engine, the route to include the at least one physical path and the at least one network path to reduce a total transfer time of the amount of data from the customer center to the cloud storage service and use available capacity of the at least one network path and the at least one first physical path, wherein the at least one network path is selected based at least in part on the at least one network path satisfying a minimum network capacity and a utilization of a storage capacity or a network capacity of one or more physical stations of the pair of physical stations being below a threshold; and
associating, by the routing engine, routing information with the physical storage device based on the route; and
upon detecting that the physical storage device is connected to a network via the at least one of the plurality of physical stations, cause, by the routing engine, the amount of data to be transferred over the at least one network path to the cloud storage service.

2. The computer-implemented method of claim 1, further comprising obtaining network capacity information of at least one of the plurality of physical stations, wherein selecting the at least one physical path and the at least one network path to reduce the total cost value is further based on the obtained network capacity information.

3. The computer-implemented method of claim 1, wherein selecting the route to include the at least one physical path and the at least one network path is based on an indication in the request to designate a network transfer of the amount of data.

4. The computer-implemented method of claim 1, further comprising associating a weighted reliability factor to the at least one physical path and the at least one network path, wherein selecting the at least one physical path and the at least one network path to reduce the total cost value is further based on the weighed reliability factors.

5. A system, comprising:
one or more processors;
memory that stores computer-executable instructions that, as a result of being executed, cause the one or more processors to:
obtain, by a computing resource service provider, a request to transfer an amount of data from a customer center to a data storage service, wherein the data storage service is part of a computing resource service provider that comprises a plurality of stations;
determine, by a routing engine, a route for the amount of data to reach the data storage service from the customer center, wherein the route comprises at least one of a first physical path for the amount of data to traverse loaded into a physical storage device or at least one network path for the amount of data loaded onto the physical storage device to traverse over at least one network connection, wherein determining the route further comprises:
selecting, by the routing engine, at least one of the first physical path or the at least one network path based on available capacity of the at least one first physical path and the at least network path capacity and to reduce a transfer time of the amount of data from the customer center to the data storage service;
associating, by the routing engine, routing information with the physical storage device based on the route; and
upon detecting that the physical storage device is connected to a network with at least a minimum network bandwidth, cause, by the routing engine, the amount of data to be transferred over the at least one network path to the data storage service.

6. The system of claim 5, wherein selecting the route to include at least one of the at least one physical path or the at least one network path is based on information in the request.

7. The system of claim 5, wherein the route comprises one network path.

8. The system of claim 5, wherein the route comprises the first physical path and the at least one network path.

9. The system of claim 5, wherein the instructions that, as a result of being executed, further cause the one or more processors to obtain capacity information of at least one of the plurality of stations, wherein selecting at least one of the first physical path or the at least one network path to reduce the transfer time is further based on the obtained capacity information.

10. The system of claim 5, wherein the instructions that, as a result of being executed, further cause the one or more processors to obtain shipping carrier information comprising estimated times to deliver the physical storage device between stations of the plurality of stations, wherein determining the route is further based on the obtained shipping carrier information.

11. The system of claim 5, wherein the route for the physical storage device to reach the data storage service from the customer center is determined before the physical storage device is located at the customer center.

12. The system of claim 5, wherein the instructions that, as a result of being executed, further cause the one or more processors to in response to receiving the request, cause a physical storage device to be transported to the customer center.

13. The system of claim 5, wherein the instructions that, as a result of being executed, further cause the one or more processors to modify the route upon or after the physical storage device is located at the customer center.

14. A non-transitory computer-readable storage medium storing thereon executable instructions that, as a result of being executed by one or more processors of a computer system, cause the computer system to at least:
   obtain by a routing engine, a request to transfer data from a client device to a data storage service, wherein the data storage service is part of a computing resource service provider that comprises a plurality of physical stations;
   determine, by the routing engine, a route for the data to reach the data storage service from the client device, wherein the route comprises at least one of a physical path for the amount of data to travel loaded into a physical storage device or a network path for the data loaded onto the physical storage device to traverse over at least one network connection, wherein determining the route further comprises:
      selecting, by the routing engine, at least one of the physical path or the network path based on available capacity of the at least one physical path and the network path and to reduce a total cost value for the of data to reach the data storage service;
      associating, by the routing engine, routing information with the physical storage device based on the route; and
   upon detecting that the physical storage device is connected to a network with at least a minimum network bandwidth, cause, by the routing engine, the amount of data to be transferred over the network path to the data storage service.

15. The non-transitory computer-readable storage medium of claim 14, wherein the instructions further comprise instructions that, as a result of being executed by the one or more processors, cause the computer system to:
   associate respective cost values to respective individual physical paths and individual network paths between individual stations of the plurality of stations; and
   select at least one of the physical path or the network path to reduce a total cost value that includes the cost of the at least one physical path and the cost value of the network path for the amount of data to travel over at least one network connection.

16. The non-transitory computer-readable storage medium of claim 15, wherein the cost values comprise a time for the data to be transferred over the individual physical paths or the individual network paths.

17. The non-transitory computer-readable storage medium of claim 14, wherein the route comprises the network path.

18. The non-transitory computer-readable storage medium of claim 14, wherein the route comprises the physical path and the network path.

19. The non-transitory computer-readable storage medium of claim 18, wherein the instructions further comprise instructions that, as a result of being executed by the one or more processors, cause the computer system to:
   update, concurrently with the data traversing the route, the routing information to modify at least one of the one physical path or the network path of the route.

20. The non-transitory computer-readable storage medium of claim 14, wherein the instructions further comprise instructions that, as a result of being executed by the one or more processors, cause the computer system to:
   obtain capacity information of at least one of the plurality of stations or the network path, wherein selecting at least one of the first physical path or the network path to reduce the total cost value is further based on the obtained capacity information.

21. The computer-implemented method of claim 1, wherein the at least one physical path comprises a physical path utilized by a shipping service to ship the physical storage device loaded with the amount of data between two of: the customer center and one or more physical stations of the plurality of physical stations.

22. The computer-implemented method of claim 1, further comprising:
   dynamically selecting, by the routing engine, the route to include the at least one physical path and the at least one network path to reduce a total transfer time of the amount of data from the customer center to the cloud storage.

23. The system of claim 5, wherein the at least one first physical path comprises a physical path utilized by a shipping service to ship the physical storage device loaded with the amount of data between two of: the customer center and one or more physical stations of the plurality of physical stations.

24. The system of claim 5, wherein selecting the route to include at least one of the at least one first physical path or the at least one network path is performed dynamically.

25. The non-transitory computer-readable storage medium of claim 14, wherein the at least one physical path comprises a physical path utilized by a shipping service to ship the physical storage device loaded with the amount of data between two of: the customer center and one or more physical stations of the plurality of physical stations.

26. The non-transitory computer-readable storage medium of claim 14, wherein the instructions further comprise instructions that, as a result of being executed by the one or more processors, cause the computer system to:
   modify the route to include at least one second physical path, or at least one second network path based on one or more of new information or a location of the physical storage device.

* * * * *